No. 854,508. PATENTED MAY 21, 1907.
S. LEETHAM.
PROCESS FOR PRODUCING A BLEACHING, STERILIZING, OR CONDITIONING AGENT.
APPLICATION FILED JULY 16, 1904.
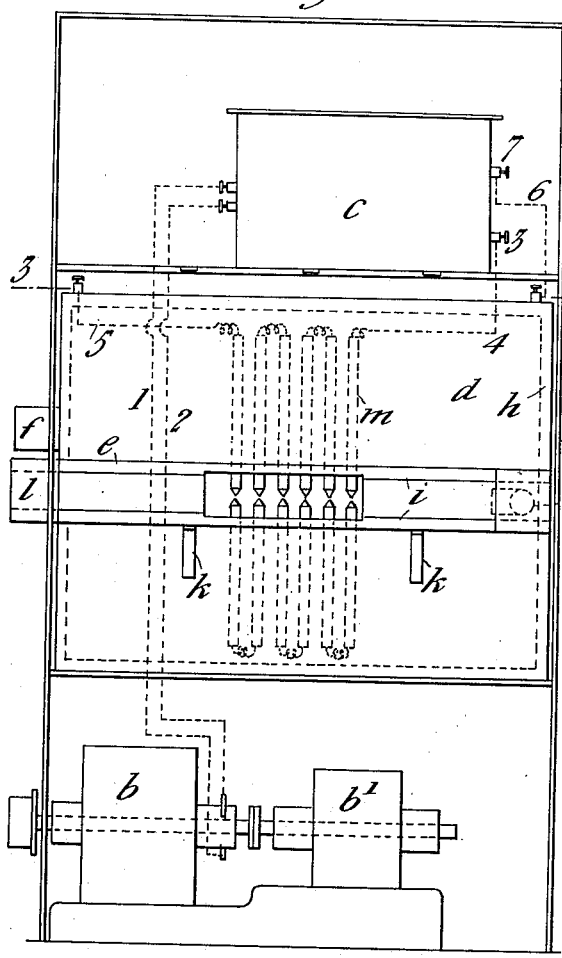
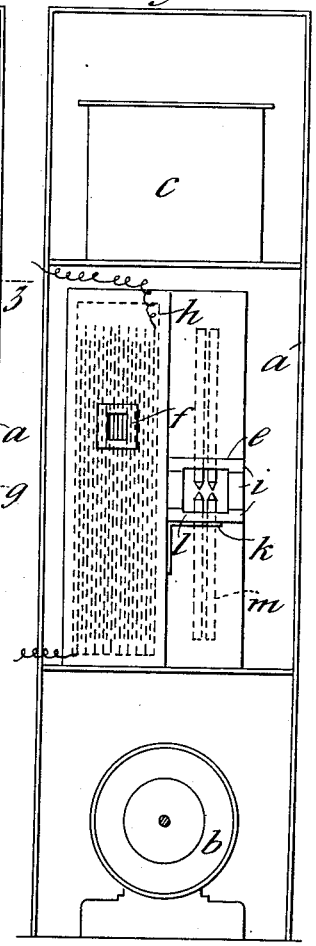
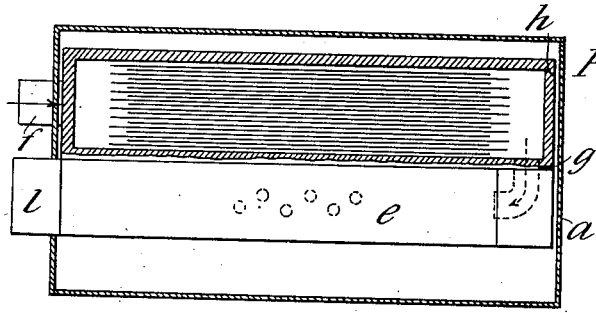
WITNESSES
INVENTOR
Sidney Leetham
by Bakewell & Byrnes
his Attorneys

UNITED STATES PATENT OFFICE.

SIDNEY LEETHAM, OF YORK, ENGLAND, ASSIGNOR TO THE OZONIZED OXYGEN COMPANY LIMITED, OF MANCHESTER, ENGLAND.

PROCESS FOR PRODUCING A BLEACHING, STERILIZING, OR CONDITIONING AGENT.

No. 854,508.          Specification of Letters Patent.          Patented May 21, 1907.

Application filed July 16, 1904. Serial No. 216,892.

*To all whom it may concern:*

Be it known that I, SIDNEY LEETHAM, a subject of the King of Great Britain and Ireland, residing at "Elm Bank," York, in the county of York, England, miller, have invented a certain new and useful Process for Producing a Bleaching, Sterilizing, or Conditioning Agent, of which the following is a specification, for which I have applied for a patent in Great Britain, filed March 9, 1904, No. 5,790.

My invention relates to the production of an improved gaseous agent, applicable for bleaching, conditioning or sterilizing flour or other materials requiring to be thus treated, or for sterilizing milk or food products or other substances liable to fermentation or decay, or for bleaching cotton yarns, calico, oils, sugar and the like.

In Frichot's British specification No. 21,971 of 1898 there are described two forms of apparatus for use in bleaching flour, which are illustrated in Figs. 5 and $5^a$ of that specification respectively. One of them works with a sparking electrical discharge, and the other with a silent electrical discharge or inductive effect. Frichot proposed the one apparatus as an alternative to the other, for charging air with ozone, but I have found that the gaseous agent produced varies considerably in composition in the two forms of apparatus, and under different conditions. It may vary from the extreme at one end of air charged almost solely with ozone, produced by the silent discharge or induction type of apparatus, to the extreme at the other end of air containing very little ozone but some other compound or compounds (probably a mixture of nitric oxid, nitrogen trioxid and nitrogen peroxid, but possibly some other substance or substances not yet identified), having bleaching or sterilizing properties, produced by the sparking discharge type of apparatus.

I have found that a greatly improved bleaching or conditioning or sterilizing agent is obtained by passing air through both types of apparatus, either in succession or not, that is to say, by my invention either I pass air successively through an ozonizer and an apparatus in which there are sparking discharges, in any order, or I pass air through an ozonizer and mix it with air which has been passed through a sparking discharge apparatus. The treated air thus obtained constitutes my new agent which I bring into intimate contact in any suitable manner, with the material requiring to be bleached, sterilized or conditioned. The best effect is obtained when the air is passed first through an ozonizer and then through a sparking discharge apparatus; the effect is not so good when this order of using the apparatus is reversed and is still less good when a current of air which has passed through the ozonizer is mixed with one that has passed through the sparking discharge apparatus, although in both the last named cases the effect is an improvement as compared with the use of either apparatus alone.

My new bleaching agent consists therefore of air laden with ozone and containing a proportion of the product of the action of a sparking electrical discharge on air, which is probably an oxid or oxids of nitrogen, although the odor of the gas indicates the presence of some other substance or substances not yet identified.

My invention is not limited to the nature of the apparatus employed so long as one of them is an ozonizer working by silent discharge while the other has sparking discharges.

To illustrate my invention, however, I will describe with reference to the accompanying drawings, an apparatus which has been used.

Figure 1 is a front view of the apparatus necessary for generating the mixture of gaseous products with which the material requiring to be bleached or sterilized and conditioned, is to be treated, all contained in a fire-proof casing *a* which is shown in the drawings as having had its doors removed. Fig. 2 is a side view with the side of the casing *a* removed. Fig. 3 is a horizontal section on line 3—3 of Fig. 1.

The apparatus comprises a dynamo *b*, a transformer *c*, an ozonizer *d* and a sparking discharge apparatus *e*, all conveniently arranged in a fire-proof casing *a* in superimposed compartments therein as shown in Figs. 1 and 2.

The ozonizer *d* may be of the well known type consisting of alternating plates $d'$ and grids $d^2$ of metal, with interposed sheets of insulating material, arranged in vertical planes in a casing $h$; all the grids are electrically connected with one terminal of the ozonizer and all the plates with the other. An air inlet $f$ and outlet $g$ are provided at opposite ends of the casing $h$ so that air introduced into the one must pass between the plates and grids on its way to the other.

The sparking discharge apparatus may consist of a trunk or conduit built up of fireproof plates $i$, preferably slate slabs. This conduit is supported on suitable brackets $k$ fixed to the casing $h$ and through the top and bottom plates $i$ are passed electrodes $m$ of metal wire, carbon or other suitable material, each of the upper ones being in the same axial line with a lower one and preferably distant from it by about one-eighth of an inch. At the part of the conduit where these electrodes are, the side may conveniently have a glass window in it to allow of the character of the sparks between the electrodes being examined. As shown in Fig. 3 the outlet from the ozonizer casing communicates with one end of this conduit so that the air having traversed the ozonizer passes between the electrodes to the outlet $l$ at the other end of the conduit.

It is advantageous to supply both ozonizer and sparking apparatus from the same source of current and to connect the ozonizer in series with the sparking electrodes, that is to say one end of the secondary circuit of the transformer is connected to the plates of the ozonizer and the other end of the circuit to the grids, the sparking electrodes being interposed in series in the circuit either on the plate side or on the grid side of the ozonizer. The ozonizer thus acts as a condenser in the sparking discharge circuit, with the advantage that the electric sparks are rendered more stable, because the conditions of the circuit are such as to produce a considerable fall of potential at the sparking electrodes as the current increases, this fall of potential being given by the ozonizer so long as the latter is in series with the sparking electrodes. Moreover, the apparatus becomes practically self regulating inasmuch as the current from the ozonizer and that through the sparking electrodes must always be the same if the two are in series, whereby the amount of ozone produced is increased as the current rises by just about as much as the product of the action of the sparks is increased, so that when once the circuit is adjusted it regulates itself over a wide range of current.

In Fig. 1 the dynamo $b$ is shown as an alternating current generator the field of which is excited by an auxiliary direct current generator $b'$. The brushes of the dynamo $b$ are shown connected by wires 1 and 2 with the terminals of the primary coil of the transformer $c$ respectively. The secondary circuit of the transformer is shown from terminal 3 through wire 4 to the first of the electrodes $m$, and through all the electrodes in series, then through wire 5 to one terminal of the ozonizer. The other terminal of the ozonizer is connected through wire 6 to the other secondary terminal 7 of the transformer.

Although I have shown a particular form of apparatus for practicing this invention other forms may be used with great advantage, but as already stated the best results are obtained if as described above, the air is first passed through the ozonizer and then through the sparking apparatus as here shown. It must be added that there is a suitable velocity at which the air should pass through the apparatus here shown in order to obtain the best results. This necessarily varies with the dimensions of the apparatus and the electrical conditions, but I may illustrate the requisite proportions by reference to an apparatus actually now in use for the treatment of flour. In this apparatus the ozonizer is of the form and capacity known in the market as an Andreoli ozonizer of 80 square feet capacity, the sparking apparatus has six carbon electrodes with spark gaps about 3/32nds of an inch. The transformer is of the type known as a step-up resin oil transformer, the voltage available on the primary circuit having about 100 volts and that obtained on the secondary circuit being from 6000–8000 volts. This gives a potential difference between the terminals of the ozonizer of about 3000–4000 volts, the remainder of the potential being distributed over the spark gaps. The electric current passing through the apparatus is of very small amperage being in the case above mentioned about 0.07–0.08 ampere. Under these conditions the best velocity of the air in the electrode chamber is about fifty miles per hour, and in all cases should be sufficient to avoid complete decomposition of the ozone and the quantity to suit the above conditions, and to treat about 10 sacks of 280 lbs. each of flour per hour (such flour being contained in a chamber wherein it is suitably tossed or stirred) is 200–300 cubic feet per minute, the area of the cross section of the electrode chamber being about nine square inches.

To obtain the best results from my improved process, it has been found that, regardless of all other conditions, such as the velocity of the air through the apparatus, the size of the apparatus, strength of current, number of electrodes or size of the spark gap, the temperature within the sparking conduit or chamber should be maintained at or below a point which will prevent the complete decomposition of the ozone. Ozone can neither exist or be formed at a temperature above 350° centigrade, for if raised to a temperature above this point, it has a tendency to split up into its oxygen atoms and form oxids of nitrogen. It is the object of this process to produce a bleaching, sterilizing or conditioning agent which shall be composed of ozone and oxids of nitrogen, together with certain other constituents, the nature of which is at present unknown. When the ozonized air is subjected to the electric sparking discharge for the purpose of decomposing a portion of the ozone by electrical action, the heat generated by the sparking discharges will ordinarily be sufficient to decompose such ozone as is not decomposed by the electrical action, hence, I find it imperative to maintain the temperature of the gas subjected to the electric sparking discharges at or below the temperature at which ozone is decomposed, in order that the product of the process may contain ozone and oxids of nitrogen.

Having thus described the nature of this invention and the best means I know of carrying the same into practical effect, I claim:—

1. A process of producing a bleaching, conditioning or sterilizing agent, which consists in first ozonizing air, and then subjecting it to the action of sparking electrical discharges at a velocity sufficiently high to prevent the complete decomposition of the ozone, substantially as described.

2. The process of producing a bleaching, conditioning or sterilizing agent, which consists in passing air successively through an ozonizer and a spark discharge apparatus connected electrically in series, producing thereby a mixture of ozone and oxids of nitrogen; substantially as described.

3. The process of producing a bleaching, conditioning or sterilizing agent, which consists in passing air first through an ozonizer and then at a velocity sufficient to avoid complete decomposition of the ozone through a chamber wherein it is subjected to the action of a sparking electrical discharge; substantially as described.

4. The process of producing a bleaching, conditioning or sterilizing agent, which consists in passing air first through an ozonizer and then at a velocity of not less than 50 miles per hour through a chamber wherein it is subjected to the action of a sparking electrical discharge.

5. A process of bleaching, conditioning or sterilizing by first ozonizing air, then subjecting it to the action of sparking electrical discharges and at a velocity sufficiently high to prevent complete decomposition of ozone, and finally bringing it into intimate contact with the material to be bleached, sterilized or conditioned.

6. The herein described method of producing a bleaching, sterilizing or conditioning agent, which consists in subjecting air successively to dark and sparking electrical discharges while it is maintained in a condition to prevent complete decomposition of ozone.

7. The herein described method of producing a bleaching, sterilizing and conditioning agent, which consists in first subjecting air to dark electrical discharges, and then subjecting it to sparking electrical discharges, said air being maintained in a condition to prevent complete decomposition of ozone.

8. The herein described method of producing a bleaching, sterilizing and conditioning agent, which consists in subjecting air successively to the action of dark and sparking electrical discharges, the air being maintained below a temperature at which ozone is decomposed.

9. The herein described method of producing a bleaching, sterilizing and conditioning agent, which consists in first subjecting air to the action of dark electrical discharges, and then subjecting it to the action of sparking electrical discharges, the air being maintained below a temperature at which ozone is decomposed.

10. The herein described method of treating air for producing a bleaching, sterilizing or conditioning agent, which consists in first subjecting air to the action of dark electrical discharges, and then subjecting the air to sparking electrical discharges, the air being maintained at a velocity to prevent complete decomposition of ozone.

11. The herein described method of treating air for producing a bleaching, sterilizing or conditioning agent, which consists in first subjecting air to the action of dark electrical discharges, and then subjecting it to the action of sparking electrical discharges, said air being maintained at a temperature and at a velocity to prevent complete decomposition of ozone.

12. In the treatment of ozonized air to produce a bleaching, sterilizing or conditioning agent, the step of treating the gas to produce oxids of nitrogen and maintaining the gas in a condition to prevent the entire decomposition of the ozone, substantially as described.

13. In the treatment of ozonized air to produce a bleaching, sterilizing or conditioning agent, the step of treating the gas to produce oxids of nitrogen and maintaining the gas below a temperature at which ozone is entirely decomposed, substantially as described.

14. In the treatment of ozonized air to produce a bleaching, sterilizing or conditioning agent, the step of treating the gas to produce oxids of nitrogen and maintaining the gas at a velocity high enough to prevent the entire decomposition of ozone, substantially as described.

15. In the treatment of ozonized air to produce a bleaching, sterilizing or conditioning agent, the step of treating the gas to produce oxids of nitrogen and maintaining the gas below a temperature at which ozone decomposes and at a velocity high enough to prevent the entire decomposition of the ozone, substantially as described.

In testimony whereof I have signed my name to this specification in the presence of two subscribing witnesses.

SIDNEY LEETHAM.

Witnesses:
E. GEO. P. BOUSFIELD,
H. BECKETT.